United States Patent [19]

Watanabe et al.

[11] Patent Number: 5,474,853
[45] Date of Patent: Dec. 12, 1995

[54] RESIN COMPOSITION, MOLDED ARTICLE AND LAMP REFLECTOR

[75] Inventors: Noriyoshi Watanabe; Kazuo Yamamiya, both of Hiratsuka, Japan

[73] Assignee: Mitsubishi Gas Chemical Company, Inc., Tokyo, Japan

[21] Appl. No.: 413,436

[22] Filed: Mar. 30, 1995

Related U.S. Application Data

[62] Division of Ser. No. 110,509, Aug. 23, 1993, abandoned.

[30] Foreign Application Priority Data

Aug. 21, 1992 [JP] Japan ................................. 4-222851

[51] Int. Cl.$^6$ ........................... C08G 65/48; C08L 77/06; B32B 15/08
[52] U.S. Cl. ........................ 428/458; 478/457; 525/397; 525/413; 525/420; 525/494
[58] Field of Search ................................ 428/457, 458; 525/397, 413, 420, 494

[56] References Cited

U.S. PATENT DOCUMENTS

| | | | |
|---|---|---|---|
| 4,877,847 | 10/1989 | Masu et al. | 525/397 |
| 4,970,272 | 11/1990 | Galucci | 525/397 |
| 5,124,391 | 6/1992 | Muchlbach | 524/420 |
| 5,132,365 | 6/1992 | Galucci | 525/92 |

FOREIGN PATENT DOCUMENTS

| | | |
|---|---|---|
| 0424556 | 5/1991 | European Pat. Off. . |
| 0441623 | 8/1991 | European Pat. Off. . |
| 0528581 | 2/1993 | European Pat. Off. . |
| 289660 | 12/1986 | Japan . |

OTHER PUBLICATIONS

Watanabe et al., Patent Abstracts of Japan, Abstract of JP–4154864, "Polyamide Resin Composition", May 27, 1992.

Morishige et al., Patent Abstracts of Japan, Abstract of JP–5065410, "Polyamide Resin Composition", Mar. 19, 1993.

Derwent Abstracts, Abstract of JP–4154864, "Preparation of Lightweight, Rigid Polyamide Resin Composition Having Good Water Resistance . . . ".

*Primary Examiner*—Joseph L. Schofer
*Assistant Examiner*—I. Zemel
*Attorney, Agent, or Firm*—Wenderoth, Lind & Ponack

[57] ABSTRACT

A resin composition comprising predetermined amounts of a specific polyamide resin (A), a modified polyphenylene ether resin (B), a fibrous inorganic filler (C) having an average fiber-diameter of 10 μm or less, a powdery inorganic filler (D) having an average particle diameter of 10 μm or less, an epoxy resin (E) and a copper compound (F-1) and/or a powdery phenolic resin (F-2); a molded article formed from the resin composition; and a lamp reflector formed from the molded article. The molded article formed from the above resin composition can give an automotive lamp reflector excellent in resistance to heat generated when a lamp is on, rigidity at high temperatures, clear reflection performance on a mold article surface, adhesion to deposited aluminum and adhesion to a primer coating composition.

6 Claims, No Drawings

RESIN COMPOSITION, MOLDED ARTICLE AND LAMP REFLECTOR

This application is a divisional application of now abandoned application, Ser. No. 08/110,509, filed Aug. 23, 1993, now abandoned

FIELD OF THE INVENTION

The present invention relates to a resin composition and a molded article formed therefrom. More specifically, it relates to a resin composition which gives a molded article excellent in heat resistance, rigidity, surface smoothness and adhesion to a coating composition and a molded article formed therefrom, particularly a lamp reflector.

PRIOR ART

Thermosetting resins have replaced metals and are widely used as materials for an automotive headlamp reflector, since these resins serve to reduce the weight and permits to design more freely. However, thermosetting resins have defects in that runners and sprues formed in the molding cannot be well recycled, that molded articles require a deburring step, and that the working environment is deteriorated due to odors generated during the curing. It is therefore desired to develop a thermoplastic resin which can replace the thermosetting resins.

There have been proposed lamp reflectors formed from the following thermoplastic resin compositions.

Japanese Laid-open Patent Publication No. 192,918/1990 discloses a lamp reflector obtained by molding a resin composition containing 10 to 40% by weight of a polyamide resin such as nylon-6, nylon-6.6 or nylon 6.10 and 90 to 60% by weight of a magnesium oxide powder. The above Publication describes that a resin composition obtained by incorporating a large amount of a magnesium oxide powder into the above nylon has excellent moldability and gives a lamp reflector excellent in heat emission performance and electric insulation. However, a molded article from the above resin composition is poor in mechanical strength and rigidity, and is insufficient in these properties under heat emission when a lamp is on.

Japanese Laid-open Patent Publication No. 33,480/1992 discloses a lamp reflector obtained by molding a resin composition containing a polyphenylene sulfide resin as a matrix resin and a combination of a fibrous inorganic filler, a non-fibrous inorganic filler and a hollow inorganic filler in specific amounts. The above lamp reflector is relatively excellent in heat resistance, lightness in weight and surface smoothness. However, due to the polyphenylene sulfide resin, the above resin composition corrodes the screw and mold of a molding machine, and the lamp reflector is poor in impact resistance.

Japanese Laid-open Patent Publication No. 272,662/1989 discloses a resin composition containing a polyamide obtained from xylylenediamine as a diamine component, polyamide 66, a powdery thermosetting resin and a glass fiber. This resin composition is suitable as a molding material for molded articles which are required to have strength under heat and aging resistance under heat, such as an automobile engine cover, a silencer and a connector. However, a lamp reflector formed from this resin composition is insufficient in strength under heat, elastic modulus and clear reflection performance.

U.S. Pat. No. 4,877,849 discloses a resin composition containing a polyamide resin from xylylenediamine and a polyphenylene ether resin modified with a 1,2-substituted olefin such as maleic anhydride. It is described in this U.S. Patent that the above resin composition has excellent hygroscopicity, moldability, mechanical properties and impact resistance. However, a lamp reflector formed therefrom is insufficient in surface smoothness and adhesion to a coating composition.

The properties required of a raw material for a lamp reflector include resistance-against heat generated when a lamp is-on, rigidity at high temperatures, clear reflection performance on a molded article surface, compliance with vapor deposition of aluminum and adhesion to a primer coating composition.

On the other hand, a molding material containing, as a main component, a polyamide resin obtained from m-xylylenediamine as a diamine component gives a molded article excellent in mechanical strength, rigidity and surface appearance. However, it is not yet sufficient for producing a lamp reflector having rigidity at high temperatures, heat resistance and clear reflection performance, and it gives no practically satisfactory lamp reflector.

It is a first object of the present invention to provide a resin composition for producing a molded article which is excellent in heat resistance, rigidity at high temperature, clear reflection performance on a molded article surface, adhesion to a metal film and adhesion to a primer coating composition and which is well-balanced in these properties.

It is a second object of the present invention to provide a lamp reflector which can maintain excellent physical properties against heat generated when a lamp is on, and has clear reflection performance, and a molded article therefor.

It is a third object of the present invention to provide a lamp reflector for an automobile headlight, which can maintain excellent physical properties against heat generated when a lamp is on, has clear reflection performance and has practical usefulness and durability.

Other objects and advantages of the present invention will be apparent from the following description.

The present inventors have made diligent studies to achieve the above objects, and have found the following. A molded article obtained from a resin composition containing specific amounts of a polyamide resin from xylylenediamine as a diamine component, a modified polyphenylene ether resin prepared by reacting an unsaturated aliphatic carboxylic acid or an acid anhydride thereof, a fibrous inorganic filler having a specific average fiber diameter, a powdery inorganic filler having a specific particle diameter, an epoxy resin and a copper compound and/or a powdery phenolic resin is excellent in properties such as heat resistance, rigidity at high temperatures, clear reflection performance, adhesion to a metal film and adhesion to a primer coating composition, and the above molded article is very useful as a molded article for an automobile lamp reflector.

According to the present invention, therefore, the above objects and advantages of the present invention are achieved, first, by a resin composition comprising;

(1) an MX nylon which is formed from xylylenediamine and α, χ-linear aliphatic dibasic acid having 6 to 12 carbon atoms and has a number average molecular weight of 14,000 to 25,000 (component A-1), (2) a modified polyphenylene ether resin (component B), (3) a fibrous inorganic filler having an average fiber diameter of 10 μm or less (component C), (4) a powdery inorganic filler having an average particle diameter of 10 μm or less (component D), (5) an epoxy resin (component E), and (6) a copper compound (component F-1) and/or a powdery phenolic resin (component F-2), (i) the resin composition containing 50 to 95% by weight of the MX nylon (component A-1) and 50 to 5% by weight of the polyphenylene ether resin (component B), and (ii) the resin composition containing, per 100 parts by weight of the total amount of the MX nylon (component A-1) and the polyphenylene ether resin (component B), 5 to 60 parts by weight of the fibrous inorganic filler (component C), 20 to 180 parts by weight of the powdery inorganic filler (component D), 0.5 to 6 parts by weight of the epoxy resin (component E), and 0.1 to 6 parts by weight of the copper compound (component F-1) and/or 0.5 to 20 parts by weight of the powdery phenolic resin (component F-2).

Further, the above objects and advantages of the present invention are achieved by a lamp reflector obtained by molding the above resin composition and coated with a metal.

The resin composition, molded article and lamp reflector of the present invention will be more specifically explained hereinafter.

In the resin composition of the present invention, the MX nylon as component A-1 is a polyamide which is formed from xylylenediamine and α, χ-linear aliphatic dibasic acid having 6 to 12 carbon atoms and has a number average molecular weight of approximately 14,000 to 25,000. The MX nylon is synthesized by the polycondensation of either m-xylylenediamine alone or a mixture of at least 60% of m-xylylenediamine with 40% or less of p-xylylenediamine (the total amount of the mixture being 100%) and α, χ-linear aliphatic dibasic acid having 6 to 12 carbon atoms such as adipic acid, sebacic acid, suberic acid, undecanoic acid or dodecanoic acid. In view of the balance of the properties of a molded article, it is particularly preferred to use adipic acid or sebacic acid.

The number average molecular weight (Mn) of the MX nylon is approximately 14,000 to 25,000, preferably approximately 15,000 to 24,000.

In the present invention, a polyamide 66 (component A-2) as a polyamide component may be used in combination with the MX nylon (component A-1). The polyamide 66 has an effect on the improvement of the moldability, i.e., reduces the molding cycle. When the polyamide 66 is used, the MX nylon (component A-1)/polyamide 66 (component A-2) weight ratio is preferably 60–99%/40–1%.

The resin composition of the present invention contains a modified polyphenylene ether resin as component B. The polyphenylene ether resin before the modification is a resin whose main chain has recurring units of the formula (I),

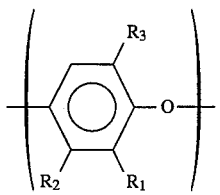
(I)

wherein $R_1$ is a lower alkyl group having 1 to 3 carbon atoms, and each of $R_2$ and $R_3$ is independently a hydrogen atom or a lower alkyl group having 1 to 3 carbon atoms.

The above polyphenylene ether resin may be any one of a homopolymer, a copolymer and a graft polymer.

Specific examples of the polyphenylene ether resin include poly(2,6-dimethyl-1,4-phenylene)ether, poly(2,6-diethyl-1,4-phenylene)ether, poly(2,6-dipropyl- 1,4-phenylene)ether, poly(2-methyl-6-ethyl-1,4-phenylene)ether and poly(2-methyl-6-propyl-1,4phenylene)ether. Particularly preferred are poly(2,6-dimethyl- 1,4-phenylene)ether, a 2,6-dimethylphenol/ 2,3,6-trimethylphenol copolymer and graft copolymers prepared by graft polymerizations of styrene with these.

The above polyphenylene ether resin can be used as the component B by modifying it with a modifying agent. In the present invention, the modifying agent is preferably selected from the following (a) to (f).

(a) an unsaturated aliphatic carboxylic acid or an acid anhydride thereof.

(b) a phenol or phenol derivative, a carboxylic acid, an alcohol, an amine or an aromatic hydrocarbon-formaldehyde resin modified with an aromatic hydrocarbon.

(c) a liquid diene compound.

(d) an epoxy compound.

(e) a compound whose molecule has (i) an ethylenically unsaturated double bond or a triple bond and (ii) a carboxyl, acid anhydride, acid amide, imide, carboxylic acid ester, amino or hydroxyl group.

(f) an oxypolycarboxylic acid.

The modification of the polyphenylene ether resin with the above modifying agent and the modification method are known as are described in the following patents.

For example, U.S. Pat. No. 4,877,847 discloses the above modifying agents (a), U.S. Pat. No. 4,153,644 discloses the above modifying agents (b), U.S. Pat. No. 4,315,086 discloses the above modifying agents (c), (d) and (e), and U.S. Pat. No. 4,873,286 discloses the above modifying agent (f).

When an unsaturated aliphatic carboxylic acid anhydride is used as a modifying agent, this anhydride and the polyphenylene ether resin are allowed to react in a molten mixture state, whereby a modified polyphenylene ether resin can be obtained.

For melting and mixing the above acid anhydride and the polyphenylene ether resin, a kneader, a Banbury mixer or an extruder can be used.

The unsaturated aliphatic carboxylic acid anhydride is selected from maleic anhydride, itaconic anhydride and citraconic anhydride. Of these, maleic anhydride particularly preferred.

The amount of the above carboxylic acid or its acid anhydride per 100 parts by weight of the polyphenylene ether resin is 0.01 to 10 parts by weight, preferably 0.1 to 3 parts by weight, more preferably 0.1 to 1 part by weight.

When the amount of the carboxylic acid or its acid anhydride per 100 parts by weight of the polyphenylene ether resin is less than 0.01 part by weight, there is little effect on the improvement of the compatibility between the polyphenylene ether resin and the polyamide resin, and it is difficult to obtain a molded article having toughness. When the above amount exceeds 10 parts by weight, disadvantageously, an excess of the modifying agent thermally decomposes and there are disadvantages in practical use such as a decrease in heat resistance and a defective appearance.

On the other hand, when the unsaturated aliphatic carboxylic acid is used for the modification of the polyphenylene ether resin, a radical-generating agent may be used as required. The radical-generating agent includes benzoyl peroxide, dicumyl peroxide and cumen hydroperoxide.

The modified polyphenylene ether resin used as component B in the present invention also includes a product prepared by reacting a composition containing the polyphenylene ether resin and an elastomer with an unsaturated aliphatic carboxylic acid or its acid anhydride. This elastomer is a hydrogenated block copolymer having an A-B-A structure in which each of As and B is a polymer block. The central block B is a polymer formed from a conjugated diene hydrocarbon compound, generally butadiene, and double bonds of the polybutadiene are converted to saturated hydrocarbon by hydrogenation. Each of the terminal blocks A is a vinyl aromatic hydrocarbon block, preferably formed of a polystyrene. The molecular weight of each terminal block A is 4,000 to 115,000, preferably 5,000 to 80,000, and the molecular weight of the central block B is 20,000 to 450,000, preferably 25,000 to 100,000. The modified polyphenylene-ether resin can be easily produced in the co-presence of the above elastomer and further, the polyamide resin composition of the present invention is improved in impact resistance when the resin composition contains the above elastomer.

In the resin composition of the present invention, either the MX nylon (component A-1) or a polyamide mixture containing the MX nylon (component A-1) and the polyamide 66 (component A-2) and the modified polyphenylene ether resin (component B) constitute a matrix component. Both the MX nylon (component A-1) and the polyamide mixture containing the MX nylon (component A-1) and the polyamide 66 (component A-2) are generally referred to as "polyamide resin component".

The proportion of the modified polyphenylene ether resin to the polyamide resin component can be set in a wide range. Preferably, when the amount of the polyamide resin is 50 to 95% by weight, the amount of the modified polyphenylene ether resin is 50 to 5% by weight. More preferably, when the amount of the polyamide resin is 60 to 90% by weight, the amount of the modified polyphenylene ether resin is 40 to 10% by weight. When the amount of the modified polyphenylene ether resin is smaller than the above lower limit, there is no effect on improvement in heat resistance and hygroscopicity. When the amount of the modified polyphenylene ether resin is greater than the above upper limit, undesirably, the flowability of a molten resin in molding decreases.

The fibrous inorganic filler used as component C in the present invention has an average fiber diameter of 10 μm or less, and examples thereof preferably include a glass fiber, potassium titanate whisker, aluminum borate whisker and titanium oxide whisker.

When the average fiber diameter of the fibrous inorganic filler exceeds 10 μm, undesirably, the clear reflection performance of a molded article decreases. The amount of the fibrous inorganic filler (component C) per 100 parts by weight of the total amount of the MX nylon and the modified polyphenylene ether resin is 5 to 60 parts by weight, preferably 10 to 50 parts by weight.

When the above amount is less than 5 parts by weight, the mechanical strength and the rigidity of a molded article are insufficient. When it exceeds 60 parts by weight, undesirably, the clear reflection performance of a molded article declines.

The above-described examples of the fibrous inorganic filler will be detailed below.

The glass fiber can be selected from chopped strands having an average fiber length of approximately 1 to 10 mm and bundled with a binding agent, generally used for plastic reinforcement, and glass fiber milled fibers having an average fiber length of approximately 0.01 to 1.5 mm and a small aspect ratio and not bundled. The average fiber diameter of the glass fiber is 10 μm or less, preferably 7 μm or less, more preferably 2 μm or less.

The potassium titanate whisker refers to a single crystal fiber of the formula $K_2O.nTiO_2$ or $K_2O.nTiO_2.1/2H_2O$ (in which n is an integer of 2 to 8). The potassium titanate whisker preferably has an average fiber diameter of 0.1 to 5 μm, an average fiber length of 1 to 100 μm and an average fiber length/average fiber diameter ratio (aspect ratio) of at least 10.

The aluminum borate whisker refers to a white needle-like crystal whisker of the formula $9Al_2O_3.3B_2O_3$ or $2Al_2O_3.B_2O_3$. The aluminum borate whisker preferably has an average fiber diameter of 3 μm or less, an average fiber length of 10 to 100 μm and an average fiber length/average fiber diameter ratio (aspect ratio) of at least 10.

The titanium oxide whisker used in the present invention preferably has an average fiber diameter of 0.1 to 0.5 μm, an average fiber length of 1 to 20 μm and an average fiber length/average fiber diameter ratio (aspect ratio) of at least 10.

The fibrous inorganic filler (component C) used in the present invention exhibits its effects even if it is not surface-treated. However, when it is surface-treated with a general coupling agent, a molded article shows further improvement in mechanical properties. The coupling agent is selected from silane coupling agents such as epoxysilane, aminosilane and acrylsilane and titanate coupling agents. Among these, epoxysilane and aminosilane coupling agents exhibit a greater effect, and preferred is a fibrous inorganic filler whose surface is treated with 0.3 to 5% by weight of epoxy silane or aminosilane.

In the resin composition of the present invention, the powdery inorganic filler as component D has an average particle diameter of 10 μm or less, and examples thereof preferably include mica, talc, glass beads, wollastonite and calcium carbonate. The amount of the powdery inorganic filler per 100 parts by weight of the total amount of the polyamide resin and the modified polyphenylene ether resin is 20 to 180 parts by weight, preferably 30 to 150 parts by weight.

When the above amount is less than 20 parts by weight, the clear reflection performance and the rigidity of a molded article are insufficient. When it exceeds 180 parts by weight, there is obtained no further effect on the reflection performance of a molded article. Further, undesirably, the flowability decreases and the specific gravity increases.

When mica having a specific particle diameter is incorporated as component D, the rigidity, distortion accuracy and clear reflection performance of a molded article are greatly improved. The mica can be selected from muscovite, phlogopite and biotite although not specially limited thereto. The average particle diameter of the mica is 10 μm or less, properly preferably 6 μm or less. When the average particle diameter of the mica is greater than 10 μm, no molded article having excellent surface smoothness can be obtained. The mica may be a bulk form prepared in the presence of a resin binder such as an acrylic resin or a urethane resin. Further, the mica may be surface-treated with a silane coupling agent or a titanate coupling agent before use.

The talc preferably has an average particle diameter of 10 μm or less. When the talc is used, a molded article shows an improvement in rigidity and a remarkable improvement in clear reflection performance. When the average particle diameter of the talc exceeds 10 μm, the clear reflection performance decreases.

The wollastonite has an average particle diameter of 10 µm or less, preferably 5 µm or less. When the wollastonite is incorporated, a molded article shows an improvement particularly in rigidity and clear reflection performance. When the average particle diameter of the wollastonite exceeds 10 µm, the clear reflection performance greatly decreases.

The calcium carbonate preferably has an average particle diameter of 10 µm or less. When the calcium carbonate is incorporated, the clear reflection performance of a molded article is remarkably improved. When the average particle diameter of the calcium carbonate exceeds 10 µm, the clear reflection performance decreases.

The powdery inorganic filler as component D exhibits its effects even if it is not surface-treated. However, when it is surface-treated with a general coupling agent, a molded article shows further improvement in mechanical properties. The coupling agent is selected from silane coupling agents such as epoxysilane, aminosilane and acrylsilane and titanate coupling agents. Among these, epoxysilane and aminosilane coupling agents exhibit a greater effect, and preferred is a powdery inorganic filler whose surface is treated with 0.3 to 5% by weight of epoxy silane or aminosilane.

The epoxy resin used as component E in the present invention is selected from a glycidyl ether type epoxy resin, a glycidyl ester type epoxy resin, a glycidylamine type epoxy resin, an alicyclic epoxy resin and a heterocyclic epoxy resin. A mixture containing at least one of these epoxy resins may be also used.

Examples of the glycidyl ether type epoxy resin include an epoxy resin produced from epichlorohydrin and bisphenol A, an epoxy resin produced from epichlorohydrin and bisphenol F, a phenol novolak epoxy resin produced by reacting a novolak resin with epichlorohydrin and a so-called brominated epoxy resin derived from epichlorohydrin and tetrabromobisphenol A.

Examples of the glycidylamine type epoxy resin include an epoxy resin produced from epichlorohydrin and any one of aniline, diaminodiphenylmethane, p-aminophenol, m-xylylenediamine and 1,3-bis(aminomethyl)cyclohexane.

Examples of the glycidyl ester type epoxy resin include an epoxy resin produced from epichlorohydrin and ally one of phthalic acid, tetrahydrophthalic acid, p-oxybenzoic acid and dimeric acid.

Examples of the alicyclic epoxy resin include compounds having a cylohexene oxide, tricyclodecene oxide or cyclopentene oxide group.

Examples of the heterocyclic epoxy resin include an epoxy resin produced from epichlorohydrin and any one of hydantoin and isocyanuric acid.

Of the above epoxy resins, preferred are glycidyl ether type, glycidyl ester type and glycidylamine type epoxy resins, although the selection should be made depending upon a coating composition to be used.

The amount of the epoxy resin as component E per 100 parts by weight of the total amount of the polyamide resin and the modified polyphenylene ether resin is 0.5 to 6 parts by weight, preferably 1 to 4 parts by weight.

When the above amount of the epoxy resin is less than 0.5 part by weight, there is little effect on improvement in the adhesion to a coating composition. When it exceeds 6 parts by weight, undesirably, the moldability, mechanical strength and rigidity deteriorate.

For improving the heat resistance of a molded article, the resin composition of the present invention contains one or both of a copper compound (component F-1) and a powdery phenolic resin (component F-2).

Examples of the above copper compound (component F-1) include copper chloride, copper bromide, copper fluoride, copper iodide, copper thiocyanate, copper nitrate, copper acetate, copper naphthenate, copper caprate, copper laurate, copper stearate, copper acetylacetonate, copper oxide (I) and copper oxide (II). The amount of the copper compound (component F-1) per 100 parts by weight of the polyamide resin and the modified polyphenylene ether resin is 0.1 to 6 parts by weight, preferably 1 to 4 parts by weight.

When the above amount of the copper compound is less than 0.1 part by weight, there is little effect on the improvement in heat resistance. When it exceeds 6 parts by weight, not only the effect on the improvement in heat resistance is saturated, but also the adhesion to a coating composition decreases.

The use of the copper compound (component F-1) in combination with an alkali metal halide gives a molded article having further improved heat resistance. Specific examples of the alkali metal halide include chlorides, bromides and iodides of sodium and potassium. The amount of the alkali metal halide per 100 parts by weight of copper of the copper compound (component F-1) is 50 to 300 parts by weight, preferably 100 to 200 parts by weight. The alkali metal halide and the copper compound give a synergistic effect on the improvement in heat resistance. When the above amount of the alkali metal halide is less than 50 parts by weight, the heat resistance is not improved as expected. When it exceeds 300 parts by weight, there is no further improvement in the heat resistance.

The powdery phenolic resin (component F-2) has an average particle diameter of 1 to 800 µm, preferably 1 to 100 µm, more preferably 1 to 50 µm.

Further, the powdery phenolic resin (component F-2) preferably contains a methylol group, and the amount of tile methylol group in this case is preferably 0.5 to 10% by weight.

When the average particle diameter of the powdery phenolic resin (component F-2) exceeds 800 µm, the mechanical strength decreases. Although a powdery phenolic resin having an average particle diameter of less than 1 µm can be used, it is difficult to produce or obtain at present.

The amount of the powdery phenolic resin (component F-2) per 100 parts by weight of the polyamide resin and the modified polyphenylene ether resin is 0.5 to 20 parts by weight, preferably 1 to 15 parts by weight, more preferably 2 to 10 parts by weight.

When the above amount of the powdery phenolic resin (component F-2) is less than 0.5 part by weight, there is little effect on the improvement in heat resistance. When it exceeds 20 parts by weight, undesirably, the clear reflection performance deteriorates.

The resin composition of the present invention may further contain other resin in an amount of 30 parts by weight or less, preferably 20 parts by weight or less, per 100 parts by weight of the total amount of the polyamide resin and the modified polyphenylene ether resin. The above "other resin" includes polyethylene terephthalate (PET), polybutylene terephthalate (PBT), polycarbonate (PC), polyphenylene sulfide (PPS), an acrylonitrile-styrene copolymer (AS), polyolefins and ethylene-propylene rubber. These other resins may be used alone or in combination.

The resin composition of the present invention may further contain generally known additives such as a nucleating agent, a plasticizer, a mold releasing agent, a flame retardant, a lubricant and a pigment. Further, the resin composition of the present invention may contain other inorganic filler or organic filler within the range not to impair the properties of the resin composition.

The resin composition of the present invention can be obtained by melt-kneading the above components with a general single-screw or twin-screw extruder.

The resin composition of the present invention can be injection-molded when it is melted, to give a molded article, and the molded article has excellent properties as a lamp reflector. A lamp reflector can be obtained by forming a metal film on the reflection surface of the molded article. The metal film can be formed on the reflection surface by a method known per se, for example, a metal plating method, a vapor deposition method or a sputtering method. A vapor deposition method is particularly preferred. The metal for forming the metal film includes aluminum, chromium and nickel, and aluminum is particularly preferred.

The present invention will be detailed by reference to Examples, in which "part" stands for "part by weight" unless otherwise specified.

In Examples and Comparative Examples, the molding conditions were set at a resin temperature of 280° C., a mold temperature of 130° C. and an injection pressure of 1,100 kgf/cm$^2$.

The various properties were evaluated by the following methods.

1) Flexural strength: ASTM D790
2) Flexural modulus: ASTM D790
3) Clear image reflection performance on molded article surface (image clarity):

A 100 mm×100 mm×3 mm flat plate was produced with a mold which was mirror-finished with #3,000, and its surface was measured for clear reflection performance with an image clarity measuring apparatus (ICM-2DP supplied by Suga Shikenki K.K.) at an optical comb of 1.0 mm. The greater the measurement value is, the higher the clear reflection performance of a molded article is.

4) Adhesion to vapor-deposited aluminum coating:

The same molded article as that prepared in the above 3) was spray-coated with a primer coating composition (thermosetting coating composition BP-50, supplied by Fujikura Kasei Co., Ltd) to form a coating having a thickness of about 20 μm, and the coating composition was cured at 130° C. for 40 minutes. Then, aluminum was vapor-deposited thereon under vacuum to form a coating having a thickness of about 1,000 Å. The adhesion to the vapor-deposited aluminum coating was evaluated by the following cross-cut test.

Cross-cut test; Eleven cuts were vertically and horizontally made on the vapor-deposited aluminum coating at intervals of 1 mm to form 100 squares each of which had a size of 1 mm×1 mm.

Then, a cellophane adhesive tape (Cellotape CT-18, supplied by Nichiban Co., Ltd.) was attached to a whole area of the squares, and peeled. These procedures were repeated twice to observe whether or not the aluminum coating peeled.

Evaluation O: No peeling
X: Peeled

5) Heat resistance of aluminum-deposited molded article:

An aluminum-deposited molded article obtained in the same manner as above (4) was allowed to stand at a hot air circulating, constant-temperature chamber set at 180° C. for 24 hours, and the aluminum coating surface was observed to determine a change.

Evaluation o: no change
X; fogging or whitening

6) Deflection temperature under load: ASTM D648

EXAMPLE 1

25 Grams of maleic anhydride was added to 45 kg of polyphenylene ether (to be sometimes abbreviated as "PPE" hereinafter) having an intrinsic viscosity, measured in chloroform at 25° C., of 0.45 dl/g, and these components were mixed with a super mixer for 3 minutes. The mixture was melt-kneaded under heat with a twin-screw extruder to give PPE modified with maleic anhydride (to be sometimes abbreviated as "modified PPE" hereinafter).

20 Parts of the above modified PPE, 80 parts of poly-m-xylyleneadipamide (to be referred to as "polyamide MXD6" hereinafter) having a number average molecular weight of 16,000, obtained by the polycondensation of m-xylylenediamine and adipic acid, 20 parts of potassium titanate whisker (Tismo D102, supplied by Otsuka Chemical Co., Ltd), 50 parts of calcium carbonate (average particle diameter 2 μm), 1.5 parts of an epoxy resin (Epikote 517, supplied by Yuka-Shell Epoxy K.K.) and 0.15 part of copper (I) oxide were dry-blended in a tumbler, and the blend was melt-kneaded with an extruder set at 285° C. to give a resin composition.

Table 1 summarizes the composition.

Test pieces were formed from the above resin composition by means of an injection molding machine, and evaluated. Table 1 shows the results.

EXAMPLE 2

4 Kilograms of a polystyrene-ethylenebutylene block copolymer (KRATON G1650, supplied by Shell Chemical Company) as an elastomer component and 25 g of maleic anhydride were added to 46 kg of PPE, and these components were mixed with a super mixer for 3 minutes. The mixture was melt-kneaded under heat with a twin-screw extruder to give a rubber-containing PPE modified with maleic anhydride (to be sometimes referred to as "elastomer-containing modified PPE" hereinafter).

20 Parts of the above elastomer-containing modified PPE, 80 parts of polyamide MXD6 having a number average molecular weight of 16,000, obtained by the polycondensation of m-xylylenediamine and adipic acid, 20 parts of potassium titanate whisker (Tismo D102, supplied by Otsuka Chemical Co., Ltd), 50 parts of calcium carbonate (average particle diameter 2 μm), 1.5 parts of an epoxy resin (Epo-tohto YD-5013, supplied by Tohto Kasei Co., Ltd), 0.15 part of copper (I) oxide and 6 parts of a powdery phenolic resin (Bell Pearl R-800, supplied by Kanebo, Ltd.) were dry-blended in a tumbler, and the blend was melt-kneaded with an extruder set at 285° C. to give a resin composition. Table 1 summarizes the composition.

Test pieces were formed from the above resin composition by means of an injection molding machine, and evaluated. Table 1 shows the results.

EXAMPLE 3

A resin composition was obtained in the same manner as in Example 2 except that the calcium carbonate as a powdery inorganic filler was replaced with wollastonite (Wollastokup 10M-110012, supplied by NYCO) and that no powdery phenolic resin was used. Table 1 summarizes the composition.

Test pieces were formed from the above resin composition by means of an injection molding machine, and evaluated. Table 1 shows the results.

EXAMPLE 4

A resin composition was obtained in the same manner as in Example 3 except that the wollastonite as a powdery inorganic filler was replaced with 10 parts of mica (muscovite, average particle diameter 6 μm), 20 parts by weight of calcium carbonate (average particle diameter 2 μm) and 20 parts by weight of talc (average particle diameter 1.5 μm). Table 1 summarizes the composition.

Test pieces were formed from the above resin composition by means of an injection molding machine, and evaluated. Table 1 shows the results.

TABLE 1

| Example | 1 | 2 | 3 | 4 |
|---|---|---|---|---|
| Components (parts by weight) | | | | |
| Polyamide MXD6 | 80 | 80 | 80 | 80 |
| Modified PPE | 20 | — | — | — |
| Elastomer-containing modified PPE | — | 20 | 20 | 20 |
| Epoxy resin | 1.5 | 1.5 | 1.5 | 1.5 |
| Potassium titanate whisker | 20 | 20 | 20 | 20 |
| Mica | — | — | — | 10 |
| Calcium carbonate | 50 | 50 | — | 20 |
| Wollastonite | — | — | 50 | — |
| Talc | — | — | — | 20 |
| Copper (I) oxide | 0.15 | 0.15 | 0.15 | 0.15 |
| Powdery phenolic resin | — | 6.0 | — | — |
| Deflection temperature under load (°C.) | 195 | 195 | 200 | 205 |
| Flexural strength (kgf/cm$^2$) Measurement temperature: 23° C. | 1550 | 1500 | 1600 | 1540 |
| Flexural modulus (10 kgf/cm$^2$) | | | | |
| Measurement temperature: 23° C. | 103 | 100 | 115 | 110 |
| Measurement temperature: 120° C. | 28 | 25 | 33 | 30 |
| Image clarity (%) | 90 | 90 | 65 | 80 |
| Heat resistance of aluminum-deposited molded article | ○ | ○ | ○ | ○ |
| Adhesion to vapor-deposited aluminum coating | ○ | ○ | ○ | ○ |

EXAMPLE 5

A resin composition was obtained in the same manner as in Example 3 except that the potassium titanate whisker as a fibrous inorganic filler was replaced with 20 parts of titanium oxide whisker (FTL-200 (S), supplied by Ishihara Sangyo Kaisha Ltd) and that the wollastonite as a powdery inorganic filler was replaced with 10 parts of mica (muscovite, average particle diameter 6 μm), 20 parts by weight of calcium carbonate (average particle diameter 2 μm) and 20 parts by weight of talc (average particle diameter 1.5 μm). Table 2 summarizes the composition.

Test pieces were formed from the above resin composition by means of an injection molding machine, and evaluated. Table 2 shows the results.

EXAMPLE 6

A resin composition was obtained in the same manner as in Example 3 except that the potassium titanate whisker as a fibrous inorganic filler was replaced with 20 parts of aluminum borate whisker (ALBOREX S1, supplied by Shikoku Chemicals Corp.) and that the wollastonite as a powdery inorganic filler was replaced with 10 parts of mica (muscovite, average particle diameter 6 μm), 30 parts by weight of calcium carbonate (average particle diameter 2 μm) and 10 parts by weight of talc (average particle diameter 1.5 μm). Table 2 summarizes the composition.

Test pieces were formed from the above resin composition by means of an injection molding machine, and evaluated. Table 2 shows the results.

EXAMPLE 7

A resin composition was obtained in the same manner as in Example 3 except that the potassium titanate whisker as a fibrous inorganic filler was replaced with 7 parts of a glass fiber (chopped strands CS03JAFT-2, supplied by Asahi Fiber Glass Co., Ltd) and 13 parts of potassium titanate whisker (Tismo D102, supplied by Otsuka Chemical Co., Ltd) and that the wollastonite as a powdery inorganic filler was replaced with 10 parts of mica (muscovite, average particle diameter 6 μm), 30 parts by weight of calcium carbonate (average particle diameter 2 μm) and 10 parts by weight of talc (average particle diameter 1.5 μm). Table 2 summarizes the composition.

Test pieces were formed from the above resin composition by means of an injection molding machine, and evaluated. Table 2 shows the results.

EXAMPLE 8

A resin composition was obtained in the same manner as in Example 2 except that the potassium titanate whisker as a fibrous inorganic filler was replaced with a glass fiber (E-FMW-800, average fiber diameter 0.8 μm, treated with aminosilane, supplied by Nippon Muki Co., Ltd) and that no powdery phenolic resin was used. Table 2 summarizes the composition.

Test pieces were formed from the above resin composition by means of an injection molding machine, and evaluated. Table 2 shows the results.

TABLE 2

| Example | 5 | 6 | 7 | 8 |
|---|---|---|---|---|
| Components (parts by weight) | | | | |
| Polyamide MXD6 | 80 | 80 | 80 | 80 |
| Elastomer-containing modified PPE | 20 | 20 | 20 | 20 |
| Epoxy resin | 1.5 | 1.5 | 1.5 | 1.5 |
| Glass fiber (10 μmφ) | — | — | 7 | — |
| Glass fiber (0.8 μmφ) | — | — | — | 30 |
| Potassium titanate whisker | — | — | 13 | — |
| Titanium oxide whisker | 20 | — | — | — |
| Aluminum borate whisker | — | 20 | — | — |
| Mica | 10 | 10 | 10 | — |
| Calcium carbonate | 20 | 30 | 30 | 50 |
| Wollastonite | — | — | — | — |
| Talc | 20 | 10 | 10 | — |
| Copper (I) oxide | 0.15 | 0.15 | 0.15 | 0.15 |
| Deflection temperature under load (°C.) | 205 | 205 | 210 | 210 |
| Flexural strength (kgf/cm$^2$) Measurement | 1500 | 1600 | 1500 | 1700 |

TABLE 2-continued

| Example | 5 | 6 | 7 | 8 |
|---|---|---|---|---|
| temperature: 23° C. Flexural modulus (10 kgf/cm$^2$) | | | | |
| Measurement temperature: 23° C. | 107 | 130 | 110 | 125 |
| Measurement temperature: 120° C. | 28 | 40 | 32 | 40 |
| Image clarity (%) | 85 | 80 | 55 | 80 |
| Heat resistance of aluminum-deposited molded article | ○ | ○ | ○ | ○ |
| Adhesion to vapor-deposited aluminum coating | ○ | ○ | ○ | ○ |

EXAMPLE 9

A resin composition was obtained in the same manner as in Example 2 except that polyamide 66 (Amilan CM3001N, supplied by Toray Industries, Inc) was further incorporated and that no powdery phenolic resin was used. Table 3 summarizes the composition.

Test pieces were formed from the above resin composition by means of an injection molding machine, and evaluated. Table 3 shows the results.

EXAMPLE 10

A resin composition was obtained in the same manner as in Example 9 except that the amount of the potassium titanate whisker was changed from 20 parts to 30 parts and that 10 parts of mica (muscovite, average particle diameter 6 μm) and 10 parts of wollastonite (Wollastokup, supplied by NYCO) were further used as powdery inorganic fillers. Table 3 summarizes the composition.

Test pieces were formed from the above resin composition by means of an injection molding machine, and evaluated. Table 3 shows the results.

EXAMPLE 11

A resin composition was obtained in the same manner as in Example 2 except that the copper (I) oxide was replaced with 0.2 part of copper iodide and that 0.2 part of potassium iodide was further used. Table 3 summarizes the composition.

Test pieces were formed from the above resin composition by means of an injection molding machine, and evaluated. Table 3 shows the results.

EXAMPLE 12

20 Parts of an elastomer-containing modified PPE, 80 parts of a polyamide copolymer (to be referred to as "polyamide PMXD6" hereinafter) having a number average molecular weight of 20,000, obtained by the polycondensation of a diamine mixture of m-xylylenediamine with p-xylylenediamine (the proportion of the p-xylylenediamine in the diamine mixture being 30%) and adipic acid, 7 parts of the same glass fiber as that used in Example 7, 20 parts of potassium titanate whisker (Tismo D102, supplied by Otsuka Chemical Co., Ltd), 50 parts of calcium carbonate (average particle diameter 2 μm), 1.5 parts of an epoxy resin (Epo-tohto YD-5013, supplied by Tohto Kasei Co., Ltd) and 0.15 part of copper (I) oxide were dry-blended in a tumbler, and the blend was melt-kneaded with an extruder set at 290° C. to give a resin composition. Table 3 summarizes the composition.

Test pieces were formed from the above resin composition by means of an injection molding machine, and evaluated. Table 3 shows the results.

TABLE 3

| Example | 9 | 10 | 11 | 12 |
|---|---|---|---|---|
| Components (parts by weight) | | | | |
| Polyamide MXD6 | 70 | 70 | 80 | — |
| Polyamide 66 | 10 | 10 | — | — |
| Polyamide PMXD6 | — | — | — | 80 |
| Elastomer-containing modified PPE | 20 | 20 | 20 | 20 |
| Epoxy resin | 1.5 | 1.5 | 1.5 | 1.5 |
| Glass fiber (10 μmφ) | — | — | — | 7 |
| Potassium titanate whisker | 20 | 30 | 20 | 20 |
| Mica | — | 10 | — | — |
| Calcium carbonate | 50 | 50 | 50 | 50 |
| Wollastonite | — | 10 | — | — |
| Copper (I) oxide | 0.15 | 0.15 | — | 0.15 |
| Copper iodide | — | — | 0.2 | — |
| Potassium iodide | — | — | 0.2 | — |
| Deflection temperature under load (°C.) | 195 | 205 | 195 | 240 |
| Flexural strength (kgf/cm$^2$) Measurement temperature: 23° C. | 1400 | 1540 | 1400 | 1500 |
| Flexural modulus (10 kgf/cm$^2$) | | | | |
| Measurement temperature: 23° C. | 95 | 140 | 95 | 105 |
| Measurement temperature: 120° C. | 25 | 45 | 28 | 33 |
| Image clarity (%) | 85 | 60 | 90 | 90 |
| Heat resistance of aluminum-deposited molded article | ○ | ○ | ○ | ○ |
| Adhesion to vapor-deposited aluminum coating | ○ | ○ | ○ | ○ |

Comparative Examples 1–6

Resin compositions were obtained from components shown in Tables 4 and 5 in the same manner as in Example 2. The components were the same as those used in Examples 1 to 12.

Test pieces were formed from the above resin compositions by means of an injection molding machine, and evaluated. Tables 4 and 5 show the results.

TABLE 4

| Comparative Example | 1 | 2 | 3 |
|---|---|---|---|
| Components (parts by weight) | | | |
| Polyamide MXD6 | 80 | 80 | 100 |
| Polyamide 66 | — | — | — |
| Elastomer-containing modified PPE | 20 | 20 | — |
| Epoxy resin | 1.5 | 1.5 | 1.5 |
| Potassium titanate whisker | — | 50 | 20 |
| Calcium carbonate | 70 | — | 50 |
| Copper (I) oxide | 0.15 | 0.15 | 0.15 |

TABLE 4-continued

| Comparative Example | 1 | 2 | 3 |
|---|---|---|---|
| Deflection temperature under load (°C.) | 180 | 220 | 195 |
| Flexural strength (kgf/cm²) Measurement temperature: 23° C. | 1200 | 2550 | 1550 |
| Flexural modulus (10 kgf/cm²) | | | |
| Measurement temperature: 23° C. | 80 | 160 | 105 |
| Measurement temperature: 120° C. | 15 | 45 | 12 |
| Image clarity (%) | 93 | 35 | 90 |
| Heat resistance of aluminum-deposited molded article | ○ | ○ | ○ |
| Adhesion to vapor-deposited aluminum coating | ○ | ○ | ○ |

TABLE 5

| Comparative Example | 4 | 5 | 6 |
|---|---|---|---|
| Components (parts by weight) | | | |
| Polyamide MXD6 | 80 | 80 | 70 |
| Polyamide PMXD6 | — | — | 10 |
| Elastomer-containing modified PPE | 20 | 20 | 20 |
| Epoxy resin | — | 1.5 | 1.5 |
| Potassium titanate whisker | 20 | 20 | 20 |
| Mica | — | — | 50 |
| Calcium carbonate | 50 | 50 | 100 |
| Wollastonite | — | — | — |
| Talc | — | — | 50 |
| Copper (I) oxide | 0.15 | — | 0.15 |
| Deflection temperature under load (°C.) | 195 | 195 | 220 |
| Flexural strength (kgf/cm²) Measurement temperature: 23° C. | 1500 | 1500 | 1500 |
| Flexural modulus (10 kgf/cm²) | | | |
| Measurement temperature: 23° C. | 103 | 103 | 190 |
| Measurement temperature: 120° C. | 28 | 28 | 50 |
| Image clarity (%) | 90 | 90 | 20 |
| Heat resistance of aluminum-deposited molded article | ○ | X | ○ |
| Adhesion to vapor-deposited aluminum coating | X | ○ | X |

Comparative Examples 7 and 8

A resin composition was obtained in the same manner as in Example 4 except that polyamide MXD6 having a number average molecular weight of 16,000 was replaced with polyamide MXD6 having a number average molecular weight of 11,000 (Comparative Example 7) or polyamide MXD6 having a number average molecular weight of 27,000 (Comparative Example 8). Table 6 summarizes the composition.

Test pieces were formed from the above resin composition by means of an injection molding machine, and evaluated. Table 6 shows the results.

TABLE 6

| Comparative Example | 7 | 8 |
|---|---|---|
| Components (parts by weight) | | |
| Polyamide MXD6 | 80 | 80 |
| Modified PPE | — | — |
| Elastomer-containing modified PPE | 20 | 20 |
| Epoxy resin | 1.5 | 1.5 |
| Potassium titanate whisker | 20 | 20 |
| Mica | 10 | 10 |
| Calcium carbonate | 20 | 20 |
| Wollastonite | — | — |
| Talc | 20 | 20 |
| Copper (I) oxide | 0.15 | 0.15 |
| Powdery phenolic resin | — | — |
| Deflection temperature under load (°C.) | 205 | 205 |
| Flexural strength (kgf/cm²) Measurement temperature: 23° C. | 1200 | 1580 |
| Flexural modulus (10 kgf/cm²) | | |
| Measurement temperature: 23° C. | 110 | 110 |
| Measurement temperature: 120° C. | 30 | 30 |
| Image clarity (%) | 80 | 40 |
| Heat resistance of aluminum-deposited molded article | ○ | X |
| Adhesion to vapor-deposited aluminum coating | ○ | X |

What is claimed is:

1. A lamp reflector which has a reflection surface coated with metal and is obtained by molding the resin composition comprising:

(1) an MX nylon which is formed from xylylenediamine and an $\alpha, \chi$-linear aliphatic dibasic acid having 6 to 12 carbon atoms and has a number average molecular weight of 14,000 to 25,000 (component A-1), (2) a modified polyphenylene ether resin (component B), (3) a fibrous inorganic filler having an average fiber diameter of 10 μm or less (component C), (4) a powdery inorganic filler having an average particle diameter of 10 μm or less (component D), (5) an epoxy resin (component E), and (6) a copper compound (component F-1) and/or a powdery phenolic resin (component F-2), (i) the resin composition containing 50 to 95% by weight of the MX nylon (component A-1) and 50 to 5% by weight of the modified polyphenylene ether resin (component B), (ii) the resin composition containing, per 100 parts by weight of the total amount of the MX nylon (component A-1) and the modified polyphenylene ether resin (component B), 5 to 60 parts by weight of the fibrous inorganic filler (component C), 20 to 180 parts by weight of the powdery inorganic filler (component D), 0.5 to 6 parts by weight of the epoxy resin (component E), and 0.1 to 6 parts by weight of the copper compound (component F-1), and/or 0.5 to 20 parts by weight of the powdery phenolic resin (component F-2) and wherein the modified polyphenylene ether resin (component B) is a resin obtained by modifying a polyphenylene ether resin with at least one modifying agent selected from the group consisting of the following (a) to (f):
(a) an unsaturated aliphatic carboxylic acid or an acid anhydride thereof,
(b) a phenol or phenol derivative, a carboxylic acid, an alcohol, an amine or an aromatic hydrocarbon-formaldehyde resin modified with an aromatic hydrocarbon,
(c) a liquid diene compound,
(d) an epoxy compound,
(e) a compound whose molecule has (i) an ethylenically unsaturated double bond or a triple bond and (ii) a carboxyl, acid anhydride, acid amide, imide, carboxylic acid ester, amino or hydroxyl group, and
(f) an oxypolycarboxylic acid.

2. The lamp reflector of claim 1, wherein the MX nylon (component A-1) is a polyamide formed from a diamine mixture of at least 60% of m-xylylenedimane with 40% or less of p-xylylenediamine and the $\alpha, \chi$-linear aliphatic dibasic acid.

3. The lamp reflector of claim 1, wherein the fibrous inorganic filler (component C) is at least one member selected from the group consisting of a glass fiber, aa potassium titanate whisker, an aluminum borate whisker and a titanium oxide whisker.

4. The lamp reflector of claim 1, wherein the powdery inorganic filler (component D) is at least one member selected from the group consisting of mica, talc, wollastonite, glass beads and calcium carbonate.

5. The lamp reflector of claim 1, wherein the copper compound (component F-1) is copper (I) oxide, copper iodide or a mixture of these.

6. The lamp reflector of claim 1, wherein the copper compound (component F-1) is contained and an alkali metal halide is further contained in an amount of 50 to 300 parts by weight per 100 parts by weight of copper of the copper compound (component F-1).

* * * * *